United States Patent
Wang

(10) Patent No.: US 8,903,020 B2
(45) Date of Patent: Dec. 2, 2014

(54) RADIO SIGNAL RECEIVING SYSTEM

(71) Applicant: Yi Chang Hsiang Industrial Co., Ltd., Taoyuan (TW)

(72) Inventor: Gary Wang, Taoyuan (TW)

(73) Assignee: Yi Chang Hsiang Industrial, Co., Ltd., Taoyuan, Taoyuan County (TW)

(*) Notice: Subject to any disclaimer, the term of this patent is extended or adjusted under 35 U.S.C. 154(b) by 148 days.

(21) Appl. No.: 13/680,631

(22) Filed: Nov. 19, 2012

(65) Prior Publication Data

US 2014/0140377 A1 May 22, 2014

(51) Int. Cl.
*H04B 1/18* (2006.01)
*H04B 1/04* (2006.01)

(52) U.S. Cl.
CPC .............. *H04B 1/18* (2013.01); *H04B 1/0458* (2013.01)
USPC ........... 375/316; 375/258; 343/846; 343/745; 343/733; 343/830; 343/713

(58) Field of Classification Search
CPC .................. H04B 1/18; H04B 5/0037; H04L 2012/2843; H01F 27/42; H01F 38/14; H04J 7/025; H04J 17/00; H04J 5/005; H03J 2200/10
See application file for complete search history.

(56) References Cited

U.S. PATENT DOCUMENTS

| | | | | | |
|---|---|---|---|---|---|
| 2,520,988 | A | * | 9/1950 | Everitt | 343/713 |
| 4,717,921 | A | * | 1/1988 | Ohe et al. | 343/712 |
| 4,789,866 | A | * | 12/1988 | Ohe et al. | 343/712 |
| 6,288,684 | B1 | * | 9/2001 | Wiggenhorn et al. | 343/713 |
| 2005/0164666 | A1 | * | 7/2005 | Lang et al. | 455/282 |
| 2006/0262881 | A1 | * | 11/2006 | Cern | 375/300 |
| 2007/0188168 | A1 | * | 8/2007 | Stanley et al. | 324/228 |
| 2009/0034595 | A1 | * | 2/2009 | Kato et al. | 375/222 |
| 2013/0109317 | A1 | * | 5/2013 | Kikuchi et al. | 455/41.2 |
| 2014/0140377 | A1 | * | 5/2014 | Wang | 375/147 |

* cited by examiner

*Primary Examiner* — Kenneth Lam
*Assistant Examiner* — Ross Varndell
(74) *Attorney, Agent, or Firm* — Muncy, Geissler, Olds & Lowe, P.C.

(57) ABSTRACT

A radio signal receiving system for providing a signal to a transceiver includes a signal retrieving module and a signal processing module. The signal retrieving module retrieves a radio signal through one of a conducting wire in an electrical outlet, a conducting wire in a vehicular cigarette lighter, and a metallic vehicular casing. The radio signal receiving system operates without any conventional self-contained antenna and includes a radio signal receiving carrier which is either made from a conventional conducting wire or made of a metal to thereby enhance the efficiency of signal reception.

2 Claims, 6 Drawing Sheets

RADIO SIGNAL RECEIVING SYSTEM

FIELD OF THE INVENTION

The present invention relates to radio signal receiving systems, and more particularly, to a radio signal receiving system capable of operating without any conventional self-contained antenna.

BACKGROUND OF THE INVENTION

According to the prior art, a receiver system of an amplitude modulation/frequency modulation (AM/FM) receiver, a digital audio broadcasting (DAB) receiver, and a digital TV (DTV) receiver has to be connected to a self-contained antenna or antenna stand in order to function as a receiving carrier for a radio signal.

However, a conventional external antenna has to work in conjunction with a small antenna or antenna stand on the grounds of cost related limitations and space related limitation, thereby resulting in poor and inconvenient signal reception.

SUMMARY OF THE INVENTION

It is an objective of the present invention to provide a radio signal receiving system capable of operating without any conventional antenna or antenna stand.

Another objective of the present invention is to provide a radio signal receiving system characterized by a radio signal receiving carrier made from a conventional conducting wire or made of a metal.

Yet another objective of the present invention is to provide a radio signal receiving system which is easy to use and efficient.

In order to achieve the above and other objectives, the present invention provides a radio signal receiving system for providing a signal to a transceiver. The radio signal receiving system comprises: a signal retrieving module for retrieving a radio signal through one of a conducting wire in an electrical outlet and a metallic vehicular casing; and a signal processing module for performing spectrum spreading on the radio signal and augmenting a strength thereof so as for the radio signal thus processed to be provided to the transceiver.

In an embodiment, the signal retrieving module retrieving the radio signal through the metallic vehicular casing comprises: a magnet attached to the metallic vehicular casing by magnetic attraction; and a coil winding around the magnet, electrically connected to the signal processing module, capable of current induction, and identifying a resonance frequency of the radio signal by setting an inductance level of the coil, so as for the radio signal to be provided to the signal processing module. The signal retrieving module retrieving the radio signal through the conducting wire in the electrical outlet comprises: a power plug inserted into the electrical outlet to receive power from the conducting wire in the electrical outlet; a power insulation conversion circuit electrically connected to the power plug and adapted to convert the power into a direct current signal; and a resonant circuit electrically connected to the power insulation conversion circuit to receive the direct current signal and adapted to identify a resonance frequency of the radio signal in the direct current signal, so as for the radio signal to be provided to the signal processing module.

In an embodiment, the signal processing module comprises: a bandwidth tuning circuit electrically connected to the first switching portion and adapted to spread a spectrum of the radio signal received; a gain amplifying circuit electrically connected to the bandwidth tuning circuit and adapted to keep a signal amplitude of the radio signal within a predetermined range; and a standing wave tuning circuit electrically connected between the gain amplifying circuit and the receiver and adapted to generate the signal according to the radio signal and eliminate impedance mismatch arising from transmission of the signal to the receiver.

In order to achieve the above and other objectives, the present invention further provides a multifunction radio signal receiving system. The radio signal receiving system comprises a signal retrieving module. The signal retrieving module comprises a first signal retrieving portion, a second signal retrieving portion, and a first switching portion. The first signal retrieving portion retrieves the radio signal through a conducting wire in an electrical outlet and comprises a power plug, a power insulation conversion circuit, and a resonant circuit, the power plug being inserted into the electrical outlet, the power insulation conversion circuit being electrically connected to the power plug and adapted to convert power from the electrical outlet into a direct current signal, and the resonant circuit being electrically connected to the power insulation conversion circuit and adapted to identify a resonance frequency of the radio signal in the direct current signal. The second signal retrieving portion retrieves the radio signal through a metallic vehicular casing and comprises a magnet and a coil The first switching portion is electrically connected to the first signal retrieving portion and the second signal retrieving portion and switches selectively, according to an external setting, between the resonant circuit of the first signal retrieving portion and the coil of the second signal retrieving portion in order to output the radio signal retrieved.

In an embodiment, the signal retrieving module further comprises a third signal retrieving portion and a second switching portion. The third signal retrieving portion retrieves the radio signal through a conducting wire in a vehicular cigarette lighter. The second switching portion is electrically connected between the power insulation conversion circuit and the resonant circuit, is electrically connected to the third signal retrieving portion, and switches selectively to one of the power insulation conversion circuit of the first signal retrieving portion and the third signal retrieving portion according to an external setting, so as to output the radio signal retrieved.

Accordingly, the present invention is characterized in that a radio signal receiving carrier is made from a conventional conducting wire or made of a metal to enhance the efficiency of signal reception and further provide an integrated multifunction radio signal receiving system that features ease of use by a switching means.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
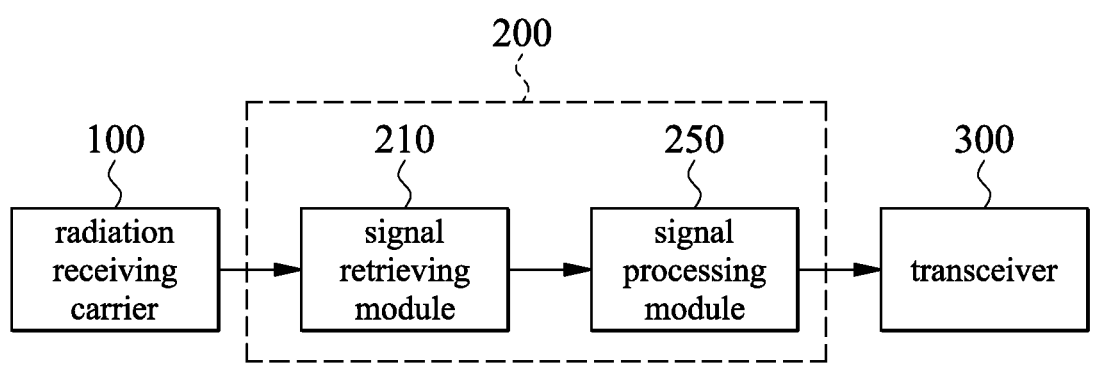
FIG. 1 is a schematic block diagram of a radio signal receiving system according to an embodiment of the present invention.

Referring to FIG. 1, there is shown a schematic block diagram of a radio signal receiving system according to an embodiment of the present invention. In an embodiment of the present invention, a radio signal receiving system 200 comprises a signal retrieving module 210 and a signal processing module 250. The radio signal receiving system 200 retrieves a radio signal from a space by means of a radiation receiving carrier 100, processes the radio signal thus retrieved, and provides a signal to a transceiver 300.

In an embodiment of the present invention, the signal retrieving module 210 retrieves a radio signal by means of a receiving carrier exemplified by a conducting wire in an electrical outlet, a conducting wire in a vehicular cigarette lighter, or a metallic vehicular casing. The signal processing module 250 performs spectrum spreading on the radio signal and augments the strength thereof, so as for the radio signal thus processed to be provided to the transceiver 300.

Figure 2:
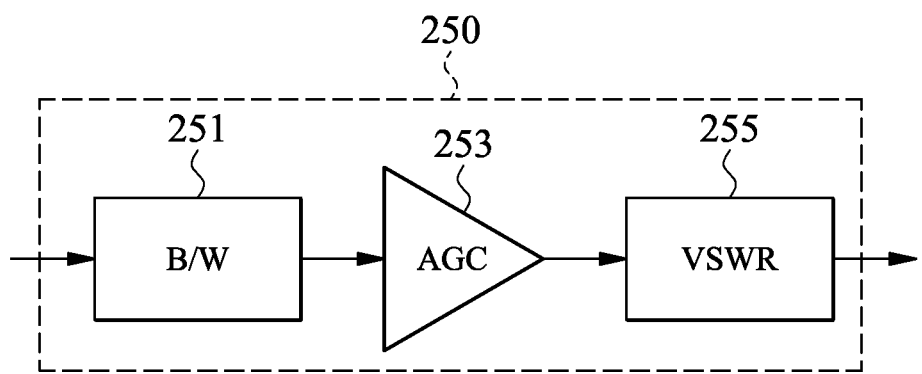
FIG. 2 is a schematic block diagram of a signal processing module of the radio signal receiving system according to an embodiment of the present invention.

Referring to FIG. 2, there is shown a schematic block diagram of the signal processing module 250 of the radio signal receiving system 200 according to an embodiment of the present invention. The signal processing module 250 comprises a bandwidth tuning circuit 251, a gain amplifying circuit 253, and a standing wave tuning circuit 255.

The bandwidth tuning circuit 251 is electrically connected to the signal retrieving module 210 for performing spectrum spreading on the received radio signal by means of a conventional filter and a spectrum spreading controller. Take the radio signal retrieved by the signal retrieving module 210 of the present invention as an example, a retrieved bandwidth of about 100 MHz can be spread to become a bandwidth of 400 MHz.

The gain amplifying circuit 253 is electrically connected to the bandwidth tuning circuit 251 and adapted to keep the signal amplitude of the radio signal within a predetermined range. In an embodiment of the present invention, the gain amplifying circuit 253 is, for example, an automatic gain control (AGC) circuit whereby the amplitude of the signal output from an amplifier is rendered constant substantially. In the gain amplifying circuit 253, the AGC circuit embodies a negative feedback system which consists of a gain controlled amplifying circuit and a control voltage generating circuit. The gain controlled amplifying circuit is located at a forward amplifying channel, and its gain varies with a control voltage. The control voltage generating circuit essentially comprises an AGC wave detector and a low-pass smoothing filter. A direct current signal proportional to the signal amplitude is always sent, regardless of the degree of fluctuation of the amplitude of the signal input into the AGC. The output voltage of the smoothened signal and the filtered direct current (DC) signal serves as a bias voltage which is applied to an amplifying circuit at the preceding level or amplifying circuits at preceding levels in a manner that the polarity of the bias voltage thus applied is correct, thereby decreasing its gain. Gain attenuation increases with the strength of the signal input into the AGC; hence, a small signal ends up with a large amplification gain, whereas a large signal ends up with a small amplification gain, such that the output signal amplitude is kept within a specific range to thereby effectuate gain control and stabilize the strength of the radio signal retrieved.

The standing wave tuning circuit 255 is electrically connected between the gain amplifying circuit 253 and the transceiver 300 and adapted to generate a signal according to the radio signal and eliminate the impedance mismatch arising from the transmission of the signal to the transceiver 300. With the high impedance of the transceiver 300 varying from brand to brand, a portion of the electromagnetic wave being transmitted is returned by reflection; as a result, the impedance mismatch happens, thereby a standing wave occurs to the transmission line. To alleviate the impedance mismatch, the present invention is characterized in that: the standing wave tuning circuit 255, such as an antenna tuner unit (ATU), adjusts impedance to thereby effectuate an output of a satisfactory voltage standing wave ratio (VSWR).

Figure 3A:
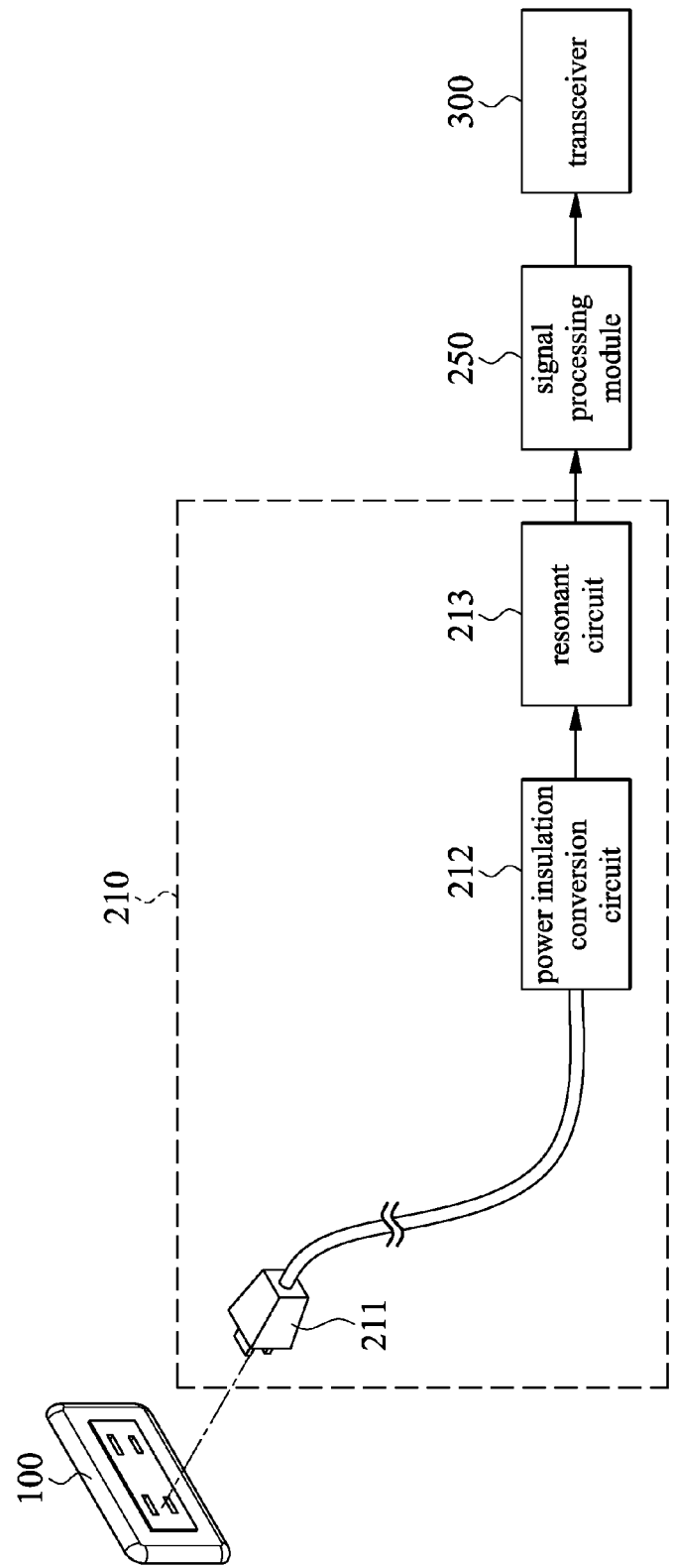
FIG. 3A is a schematic view of the radio signal receiving system according to an embodiment of the present invention.

Referring to FIG. 3A, there is shown a schematic view of the radio signal receiving system according to an embodiment of the present invention. In this embodiment, the signal retrieving module 210 retrieves the radio signal only by means of a conducting wire in the electrical outlet, wherein the conducting wire functions as the radiation receiving carrier 100. The signal retrieving module 210 comprises a power plug 211, a power insulation conversion circuit 212, and a resonant circuit 213.

The power plug 211 is inserted into the electrical outlet 100 and adapted to receive power from the conducting wire in the electrical outlet 100. The power signal comprises the radio signal. Then, the power plug 211 is electrically connected to the power insulation conversion circuit 212 (such as a transformer) which transforms the power into a direct current signal. Finally, the power insulation conversion circuit 212 is electrically connected to the resonant circuit 213 to receive the direct current signal and identify a resonance frequency of the radio signal in the direct current signal, such that the radio signal oscillating greatly at the resonance frequency is provided to the signal processing module 250. The resonant circuit 213 can be an LC circuit which is configured according to parameters, such as the parameters of a capacitor C and an inductor L (such as, the equation $f=1/(2*\pi*(LC)^{1/2})$, where f denotes harmonic frequency, $\pi$ denotes phase), so as to identify the resonance frequency of the radio signal.

Figure 3B:
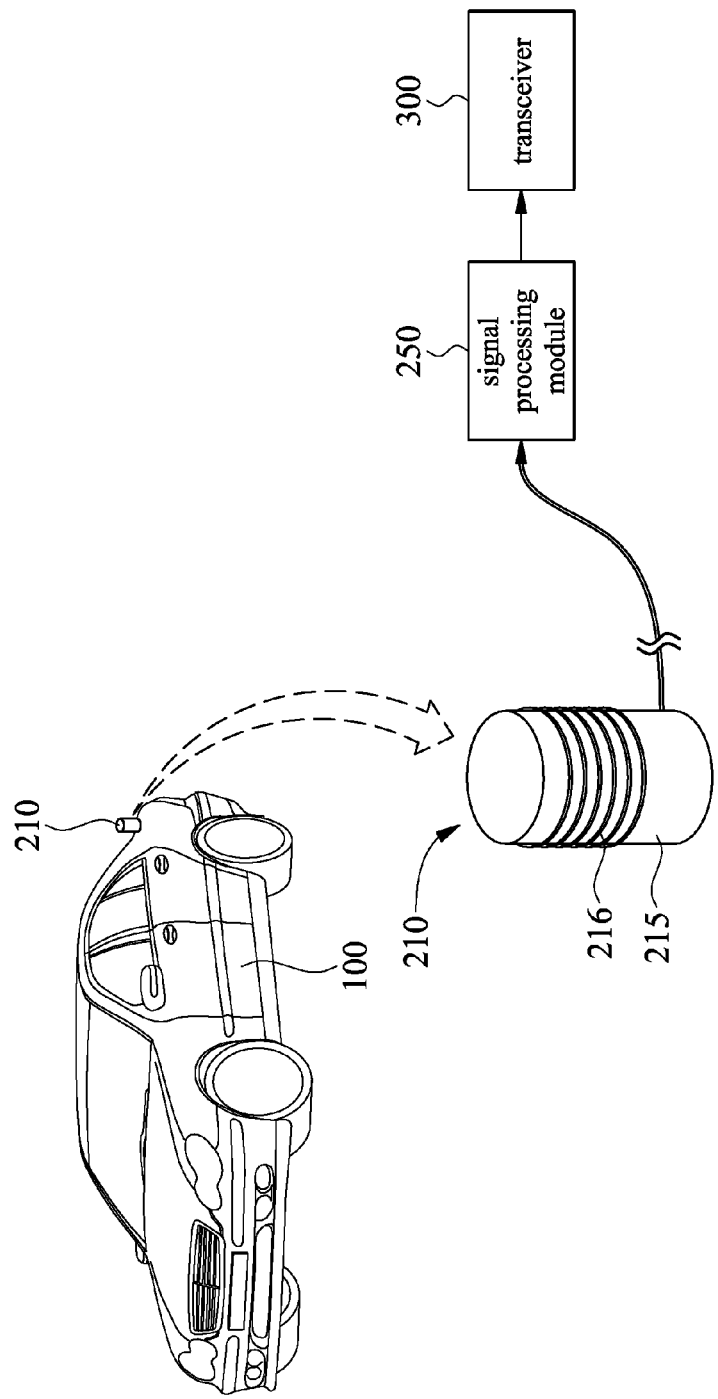
FIG. 3B is a schematic view of the radio signal receiving system according to the second embodiment of the present invention.

Referring to FIG. 3B, there is shown a schematic view of the radio signal receiving system according to the second embodiment of the present invention. In this embodiment, the signal retrieving module 210 retrieves the radio signal only by means of the metallic vehicular casing which functions as the radiation receiving carrier 100. The signal retrieving module 210 comprises a magnet 215 and a coil 216.

The magnet 215 is attached to the metallic vehicular casing by magnetic attraction. For instance, the magnet 215 is a cylinder shown in FIG. 3B or a solid of any shape. The coil 216 winds around the magnet 215 and is electrically connected to the signal processing module 250. The coil 216 is capable of current induction. The resonance frequency of the radio signal is identified, by setting the inductance level of the coil 216, such that the radio signal is provided to the signal processing module 250. In this embodiment, the lines of magnetic force of the magnet 215 interact with the metallic vehicular casing as soon as the lines of magnetic force of the magnet 215 come into contact with the metallic vehicular casing. The coil 216 and the magnet 215 together operate like an inductor, wherein the number of windings of the coil 216 matches the required inductance level. As for the metallic vehicular casing in this embodiment, the intended harmonic frequency is set to 1 μH~1000 μH.

Figure 3C:
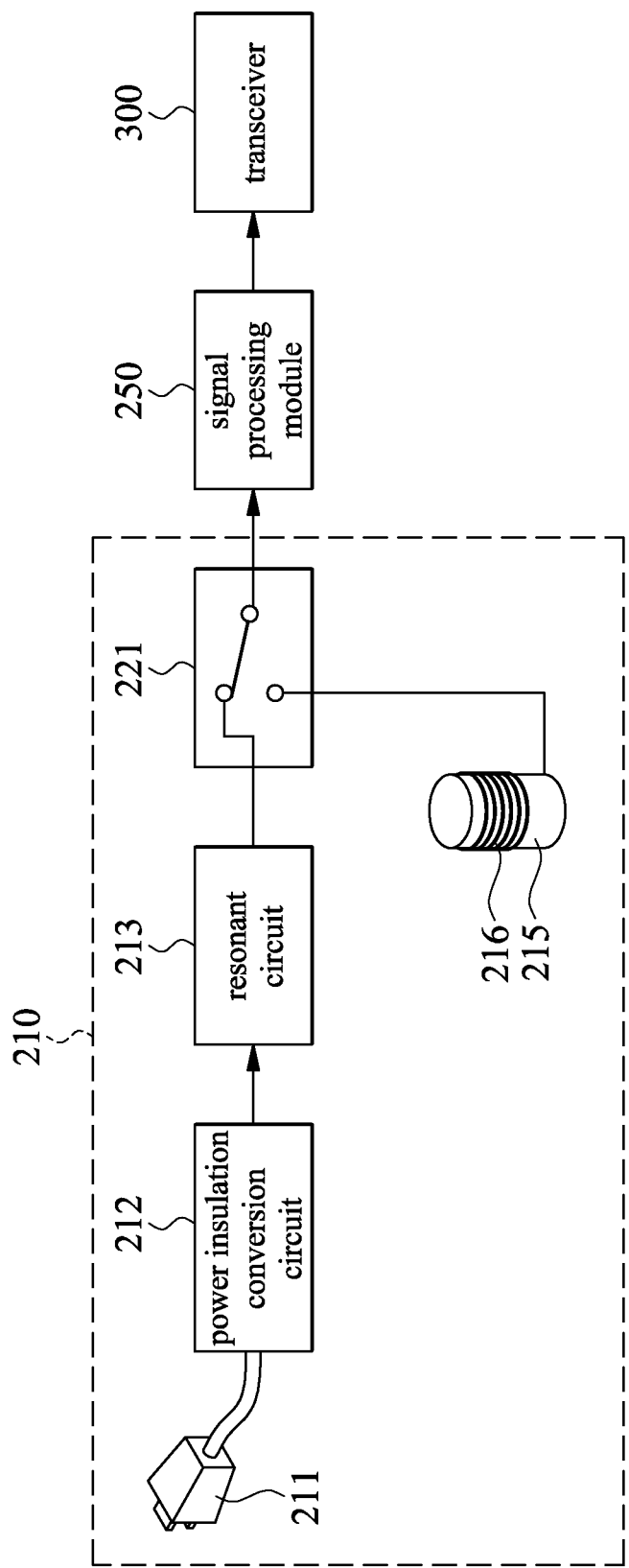
FIG. 3C is a schematic view of the radio signal receiving system according to the third embodiment of the present invention.

Referring to FIG. 3C, there is shown a schematic view of the radio signal receiving system according to the third embodiment of the present invention. In this embodiment, a metallic vehicular casing, and a conducting wire in an electrical outlet, both functioning as the radiation receiving carrier 100, are integrated to become one system. In practice, the signal retrieving module 210 and the signal processing module 250 are integrated into a device housing, leaving the power plug 211 (including a connection line connected to the power insulation conversion circuit 212), the magnet 215, and the coil 216 (including a connection line) exposed.

Given the aforesaid goal of integration, the signal retrieving module 210 comprises a first signal retrieving portion (for retrieving the radio signal by means of the radiation receiving carrier 100, that is, the conducting wire in the electrical outlet), a second signal retrieving portion (for retrieving the radio signal by means of the radiation receiving carrier 100, that is, the metallic vehicular casing), and a first switching portion 221. The first switching portion 221 (such as a route switcher) is electrically connected to the first signal retrieving portion and the second signal retrieving portion and adapted to switch selectively, according to a setting made by an external user, between the resonant circuit 213 of the first signal retrieving portion and the coil 216 of the second signal retrieving portion in order to output the radio signal retrieved.

Figure 3D:
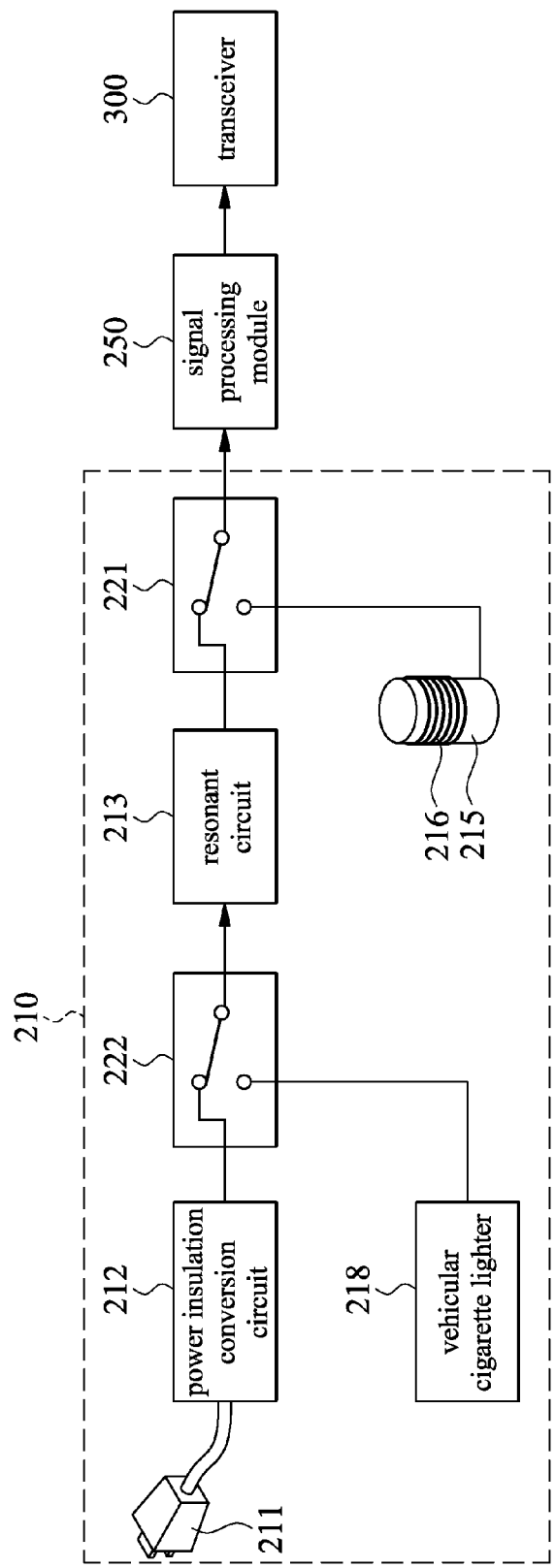
FIG. 3D is a schematic view of the radio signal receiving system according to the fourth embodiment of the present invention.

Referring to FIG. 3D, there is shown a schematic view of the radio signal receiving system according to the fourth embodiment of the present invention. Unlike the third embodiment in FIG. 3C, the fourth embodiment in FIG. 3D features a third signal retrieving portion. The third signal retrieving portion retrieves the radio signal by means of a conducting wire in a vehicular cigarette lighter 218. In the fourth embodiment, the signal retrieving module 210 further comprises the third signal retrieving portion and a second switching portion 222. The second switching portion 222 is not only electrically connected between the power insulation conversion circuit 212 and the resonant circuit 213 and electrically connected to the third signal retrieving portion (i.e., the vehicular cigarette lighter 218), but also switches selectively, according to an external setting, between the power insulation conversion circuit 212 of the first signal retrieving portion and the vehicular cigarette lighter 218 of the third signal retrieving portion in order to output the radio signal retrieved. Accordingly, the second switching portion 222 will not operate, unless the first switching portion 221 is switched to a state where the resonant circuit 213 and the signal processing module 250 are electrically connected; otherwise, the first switching portion 221 is switched to a state where the signal processing module 250 is electrically connected to the coil 216.

A metallic vehicular casing, a conducting wire in an electrical outlet 211, and a conducting wire in the vehicular cigarette lighter 218, each of which functions as the radiation receiving carrier 100, are integrated to become one system. In practice, the signal retrieving module 210 and the signal processing module 250 are integrated into a device housing, leaving the power plug 211 (including a connection line connected to the power insulation conversion circuit 212), the magnet 215, the coil 216 (including a connection line), and the vehicular cigarette lighter 218 (including a connection line) exposed.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A radio signal receiving system for retrieving a radio signal and converting the radio signal retrieved into a signal to be provided to a transceiver, comprising:
   a signal retrieving module, comprising:
      a first signal retrieving portion retrieving the radio signal through a conducting wire in an electrical outlet and comprising a power plug, a power insulation conversion circuit, and a resonant circuit, the power plug being inserted into the electrical outlet, the power insulation conversion circuit being electrically connected to the power plug and adapted to convert power from the electrical outlet into a direct current signal, and the resonant circuit being electrically connected to the power insulation conversion circuit and adapted to identify a resonance frequency of the radio signal in the direct current signal;
      a second signal retrieving portion retrieving the radio signal through a metallic vehicular casing and comprising a magnet and a coil, the magnet being attached to the metallic vehicular casing by magnetic attraction, and the coil winding around the magnet, capable of current induction, and identifying a resonance frequency of the radio signal by setting an inductance level of the coil;
      a first switching portion electrically connected to the first signal retrieving portion and the second signal retrieving portion and adapted to switch selectively to one of the resonant circuit of the first signal retrieving portion and the coil of the second signal retrieving portion according to an external setting so as to output the radio signal retrieved;
      a third signal retrieving portion retrieving the radio signal through a conducting wire in a vehicular cigarette lighter; and
      a second switch portion electrically connected between the power insulation conversion circuit and the resonant circuit, electrically connected to the third signal retrieving portions, and switching selectively to one of the power insulation conversion circuit of the first signal retrieving portion and the third signal retrieving portion according to an external setting, so as to output the radio signal retrieved; and
   a signal processing module electrically connected to the first switching portion and adapted to perform spectrum spreading on the radio signal received and augment a strength thereof so as for the radio signal thus processed to be provided to the transceiver.

2. The radio signal receiving system of claim 1, wherein the signal processing module comprises:
   a bandwidth tuning circuit electrically connected to the first switching portion and adapted to spread a spectrum of the radio signal received;
   a gain amplifying circuit electrically connected to the bandwidth tuning circuit and adapted to keep a signal amplitude of the radio signal within a predetermined range; and
   a standing wave tuning circuit electrically connected between the gain amplifying circuit and the receiver and adapted to generate the signal according to the radio signal and eliminate impedance mismatch arising from transmission of the signal to the receiver.

* * * * *